(12) United States Patent
Sood (10) Patent No.: US 8,356,106 B2
(45) Date of Patent: Jan. 15, 2013

(54) CACHE VALIDATING SCIT DNS SERVER

(75) Inventor: Arun Sood, Clifton, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 499 days.

(21) Appl. No.: 12/695,686

(22) Filed: Jan. 28, 2010

(65) Prior Publication Data

US 2010/0199122 A1    Aug. 5, 2010

Related U.S. Application Data

(60) Provisional application No. 61/149,249, filed on Feb. 2, 2009.

(51) Int. Cl.
 *G06F 15/173* (2006.01)
(52) U.S. Cl. ......... 709/229; 709/208; 709/223; 370/230
(58) Field of Classification Search .................. 709/208, 709/223, 226, 229; 370/230
See application file for complete search history.

(56) References Cited

U.S. PATENT DOCUMENTS

| | | | | |
|---|---|---|---|---|
| 5,410,668 A | * | 4/1995 | Hilton | 711/139 |
| 5,983,346 A | * | 11/1999 | Wendell | 713/1 |
| 6,054,918 A | * | 4/2000 | Holst | 340/146.2 |
| 6,718,387 B1 | * | 4/2004 | Gupta et al. | 709/226 |
| 7,085,814 B1 | * | 8/2006 | Gandhi et al. | 709/208 |
| 8,180,720 B1 | * | 5/2012 | Kovacs et al. | 706/47 |
| 2008/0109448 A1 | * | 5/2008 | Aboel-Nil et al. | 707/10 |
| 2008/0222281 A1 | * | 9/2008 | Dilley et al. | 709/223 |
| 2010/0118699 A9 | * | 5/2010 | Xiong et al. | 370/230.1 |

* cited by examiner

*Primary Examiner* — Tesfay Yohannes
(74) *Attorney, Agent, or Firm* — David Grossman (57) ABSTRACT

A cache validating SCIT-DNS Server including a server cluster, a cache copy, a controller and a validation module. Each of the servers in the server cluster uses a DNS mapping cache which maps DNS name(s) to record entry(ies). The cache copy maintains an image of DNS mapping cache(s). The controller manages the state of servers. States include a live spare state; an exposed state; a quiescent state; and a self-cleansing state. The validation module validates DNS entry(s) using a retriever module and a comparisons module. Retriever module retrieves an independent record entry associated with a selected DNS name from an external DNS resolver. The comparison module compares the independent record entry retrieved by the retriever module with the record entry associated with the selected DNS name residing in the cache copy. The validation module may cause server(s) to take an affirmative action in response to detected validation error(s).

19 Claims, 5 Drawing Sheets

CACHE VALIDATING SCIT DNS SERVER

CROSS-REFERENCE TO RELATED APPLICATIONS

The present application claims the benefit of provisional patent application Ser. No. 61/149,249 to Arun Sood, filed on Feb. 2, 2009, entitled "Self Cleansing Intrusion Tolerance Approach for Protection from Cache Poisoning and other Intrusions," which is hereby incorporated by reference in its entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Embodiments of the present invention are configured to respond to corruptions to memory cache(s) in a Self-Cleansing Intrusion Tolerance (SCIT) DNS Server. An example of a SCIT DNS server is disclosed in United States Patent Application Publication No. US 2006/0143711A1 to Huang et al. and entitled "SCIT-DNS: critical infrastructure protection through secure DNS server dynamic updates."

DNS services are a critical part of the internet infrastructure. The internet traffic is directed on the basis of the computer IP address. DNS servers translate domain names to IP addresses. The domain names are much easier for humans to remember than the IP addresses, thus, the use of DNS servers has facilitated user access to a variety of services. The DNS servers, often called name servers, maintain a variety of records—A, MX, etc. For ease of presentation, this disclosure focuses on the A record, that contains the IP address, however, one skilled in the art will recognize that other record types may similarly be monitored for corruption and protected using embodiments of the present invention.

DNS, like many other building blocks of the internet, was designed for a trusted environment. It was assumed that the DNS server will provide an authentic and accurate mapping from the domain name to the IP address. However, malicious activity has changed the trustworthiness of the DNS mapping. An example vulnerability of concern in DNS servers is called cache poisoning.

To improve performance, many DNS servers utilize cache to store the results of recent queries. Typically, the recursive Name Servers (NSs) fall into this category. For example, ISPs deploy recursive NSs. An ISP client requests the IP address for a domain. If the ISP NS does not have the information locally, it may requests information from a Global Top Level Domain (GTLD) server, and through an iterative mechanism assemble: (1) domain Name—IP address mapping, and (2) authoritative name server—IP address mapping. All this information is often stored in an ISP NS cache.

Cache poisoning, the malicious alteration of the IP addresses stored in the cache, has been a well known area of concern. In the summer of 2008, a cache poisoning attack on Name Servers became a very critical issue. Dan Kaminsky identified a weakness in DNS implementation, and presented an example of how attackers could use DNS queries to change IP addresses in the cache. A well illustrated and detailed description of the problem and related issues is disclosed on a web site www [dot] unixwiz [dot] net/techtips/iguide-kaminsky-dns-vuln [dot] html. It was shown that a malicious hacker could change the mappings in a cache and redirect the traffic to a bad guy IP address. The solution proposed for solving the cache poisoning problem in the www [dot] unixwiz [dot] net web site involved using randomly generated Query ID (also called Transaction ID) and randomly generated source port.

Embodiments of the present invention address solving the cache poisoning problem differently. In comparison to the solution discussed above, the currently disclosed embodiments are independent of how the pollution is induced. The above described approach is reactive—first the attack is modeled and then a work around developed. What about future attacks for which models have not been developed? The present embodiments we do not model the attack and do not pretend to prevent all hacks. Instead, the present embodiments use repetitive cleansing and validation to ensure the quality of the mappings. Even if some hacks succeed and alter the mappings, the repetitive examination and validation of the mappings limit the damage a hacker can accomplish. Most importantly, embodiments also limit the damage that can be done by other exploits, even exploits that are not known at this time.

Typically, DNS servers are on-line for long periods of time. Many are taken off line only to apply a patch or when there is another emergency situation, like power outage. This gives intruders ample opportunity to study the properties and assess the vulnerabilities of the server. This leads to the critical questions: What if an intruder can get a foot hold in the DNS server, and change the domain name to IP address mapping? What about the malware installed on servers? What about inadvertent configuration errors by system administrators?

To increase the trust in the DNS mapping, the DNSSEC (DNS with security extension) protocol has been developed. But DNSSEC has not been widely adopted. Only relatively small networks have adopted DNSSEC. DNSSEC, or another security extension, should be seriously considered for increasing the trust in the DNS mapping. However, as a bridge between DNS and DNSSEC, embodiments of the present invention provide an alternative solution based on the concept of intrusion tolerance.

The domain name IP address maps are stored in two places—persistent storage (typically disks), or in cache (typically main memory). Most DNS servers maintain some of the mapping in the cache to improve system performance. Unauthorized change of the mapping could have very negative impact on the users. Typically, intrusion prevention and detection systems are used to protect the servers. However, these have proven to be inadequate in preventing all intrusions. Embodiments of the present invention focus on minimizing the risk and the damage that can occur because of malicious alteration of the stored mappings.

In spite of large investments in computer security, attackers continue to evade the most advanced intrusion prevention and detection systems. The problem stems in large part from the constant innovation and evolution of attack techniques, and rapid development of exploits based on recently discovered software vulnerabilities. One conclusion is that intrusions are inevitable. The sophisticated cyber attacks lend importance to the concept of intrusion tolerance: a critical system must fend off or at least limit, the damage caused by unknown and/or undetected attacks.

The current intrusion prevention (firewalls) or detection approaches require prior knowledge of attack modalities and software vulnerabilities. These approaches are good at fighting yesterday's wars, but what about the serious current and future threats? What about the malware installed on servers? What about inadvertent configuration errors by system administrators? SCIT represents a paradigm shift to intrusion tolerance as compared to firewalls and IDSs. SCIT servers are focused on limiting the losses that can occur because of an intrusion. To achieve this goal, SCIT servers limit the exposure time of the server to the internet. The SCIT approach may achieve sub-minute exposure time for servers without service interruption. SCIT may be considered as a complement to existing approaches.

Specifically, the present embodiments extend the concept of SCIT DNS to better secure the cache with the introduction of a validation module. These new embodiments are sometimes referred to as SCIT DNS 2 in this disclosure. The constant restoration of the SCIT DNS 2 server to a pristine state is equivalent to resetting the trustworthiness of the service. Thus, the SCIT approach provides an enhanced level of trust without taking on the additional burdens of a DNSSEC implementation. The SCIT concept to DNS is extended and provides a solution that provides protection against attacks that lead to cache poisoning without knowing the attack methodology. This extension reduces the window of opportunity in which damage can be done, for example, an attacker may change a DNS entry but the polluted entry would be restored to the correct value in a short period of time (of the order of minutes).

Figure 1:
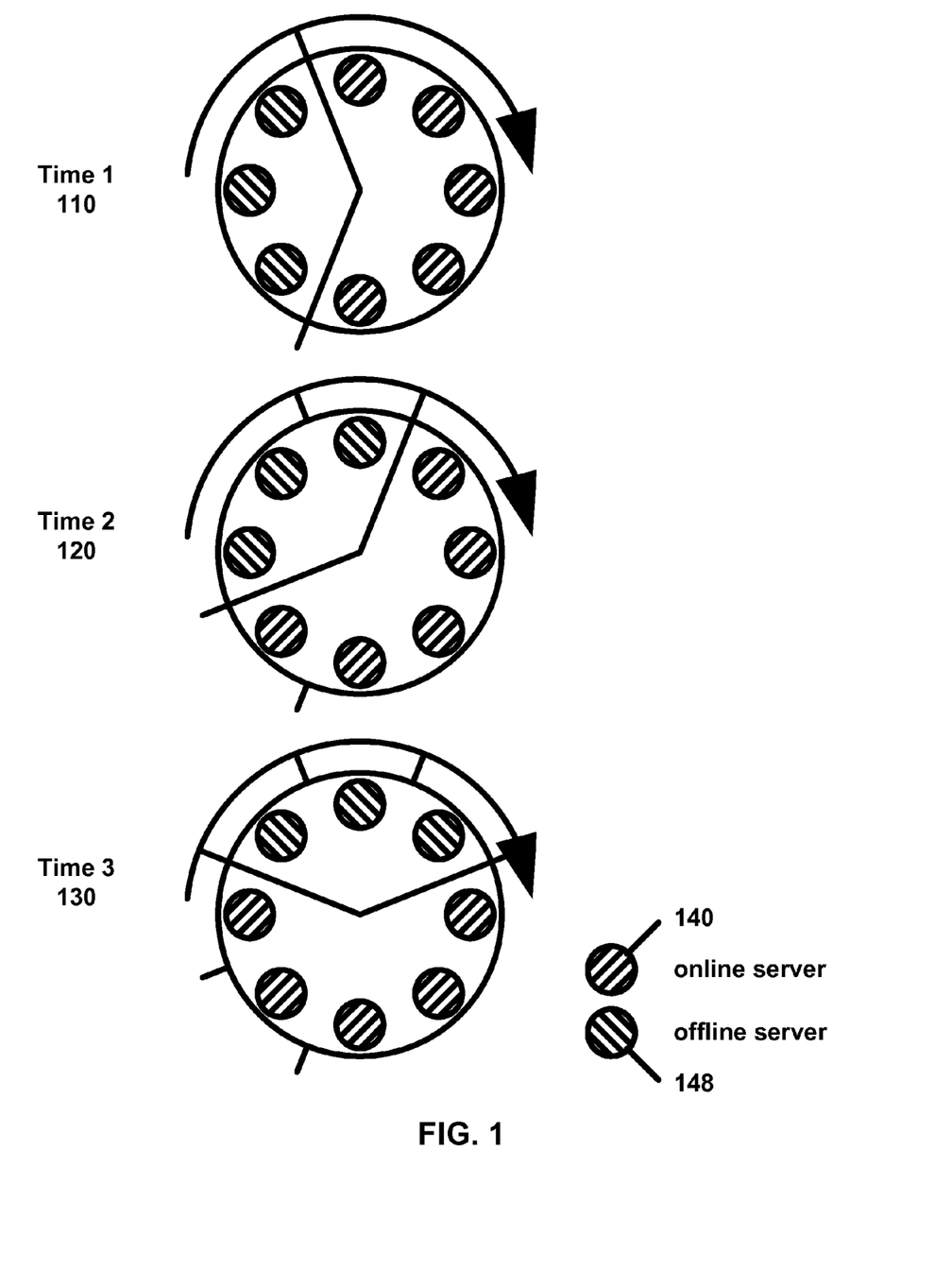
FIG. 1 shows a block diagram of servers being rotated on-line and off-line as part of a Self-Cleansing Intrusion Tolerance—Domain Name Systems (SCIT-DNS) system as per an embodiment of the present invention.

SCIT 2 embodiments utilizes redundancy and validation operations to continuously restore the cache and files of the DNS server. This is done by cycling the servers through a well defined sequence of states. In some embodiments that use virtualization technology, SCIT implementations may rotate pristine virtual servers and applications, for example, every minute, or less. Alternatively, servers may similarly rotate using control/self-cleansing logic in clusters of hardware servers. FIG. 1 is a diagram of instants of a SCIT 2 server at 3 different times (110, 120 & 130). As shown, the SCIT 2 server consists of a cluster of 8 servers. In this example, at any given time, there are 5 servers online 140 and 3 servers 150 being wiped clean and restored to a pristine state. In each case, a different set of servers is being cleaned. Eventually every server will be taken offline, cleaned and restored to its pristine state.

The number of servers that may be required to support SCIT DNS 2 may depend on the level of security and availability required. Typically, more servers lead to lower exposure time and thus enhances system security. In this discussion, an example embodiment for the minimum number of servers required is disclosed.

A SCIT DNS 2 implementation at a minimum, a cluster of 3 servers may be required. Some embodiments may use virtualization technology on specially configured server hardware to reduce the number of physical servers. In the following discussion, a server may be virtual or physical.

The Cache Copy {CC} may be, in some embodiments, a persistent server. Two of the functions could be distributed to multiple servers. For additional security this server could take advantage of the SCIT protection approach—that will reduce the exposure to the internet in the validation step below.

This server maintains an up to date copy of the cache. There are many ways to achieve this goal. One approach involves the multicasting of the cache updates to all the servers in the cluster. Another is to employ the equivalent of a memory resident data base.

At regular intervals, this server may select and validate part of the cache. This selection may be done by using a number of techniques. As an example, three options are disclosed. One technique could validate all the recent entries in the cache. A second technique could choose a random set of entries to validate. A third technique could bias the entries to be validated in such a way that the newer (or older) entries are validated more frequently.

The validation process may involve extracting the domain name, and sending a DNS query to a recursive name server for resolution. This name server is preferably not part of the cluster to which CC belongs. Thus, this is an independent validation of the entry. Note that in this state, the server is accessing the internet, and that it may be advantageous to use additional protection redundancy and rotation techniques. It is emphasized that this will not be part of the DNS 2 rotation that includes the LS-ES-QS stages discussed below. The rotation of the {CC} server could require additional servers.

A Live Spare State{LS} is part of the DNS 2 rotation. This server may be in this state for a short period of time. The function of this server is to be ready to switch to an exposed state, i.e. {ES} described below. However, before a server is ready to enter this state, it should be systematically built into a server that has been restored to a pristine state. For this reason, the {LS} server should not be directly connected to the internet. Building the {LS} server goes through the following steps: (1) Start the server with the pristine copy of the operating system; (2) Start the application with a pristine copy of the application software; (3) Copy the cache or link to the cache in {CC}; and (4) Continuously update the cache so as to capture the changes that take place while this server is {LS} state. The {LS} should now be ready to switch to {ES}.

The Exposed State {ES} is part of the DNS 2 rotation. In this state the server may accept DNS queries from the clients. If the data is in the cache may then be used to respond to DNS queries. If the domain name is not in the cache, then a recursive query may be started and the result sent to the client and also entered into the cache. All the caches in the servers in the cluster may be updated. This server should be exposed to the internet for a limited amount of time, called the Exposure Time. After this time period, the server may switch to a Quiescent State.

The Quiescent State {QS} is part of the DNS 2 rotation. In some cases, all the queries received in {ES} may not have been processed before the exposure time allowed for the {ES}. In this case, the queries may be handled by the {QS}. The server in this state should not receive new queries as its primary purpose is to complete the pending queries. On completion of this process the server may be terminated.

At any one time, in the minimum configuration, up to 4 servers may be active: one each in CC, LS, ES, and QS states. The DNS 2 rotation may go through the following sequence of states: LS, ES, and QS. Although CC may be a persistent server, it also may be included in a separate rotation to enhance security.

DNS services were designed for trustworthy environments. Because of the potential for malicious activity, the longer the server remains on-line, the lower the trust in the DNS service results. SCIT DNS helps to reduce the on-line exposure time and thus restores trust at regular intervals. SCIT DNS helps mitigate the impact of malicious change of the master file and cache poisoning attacks. The domain name mapping may be restored every rotation cycle, for example, every minute.

Figure 2:
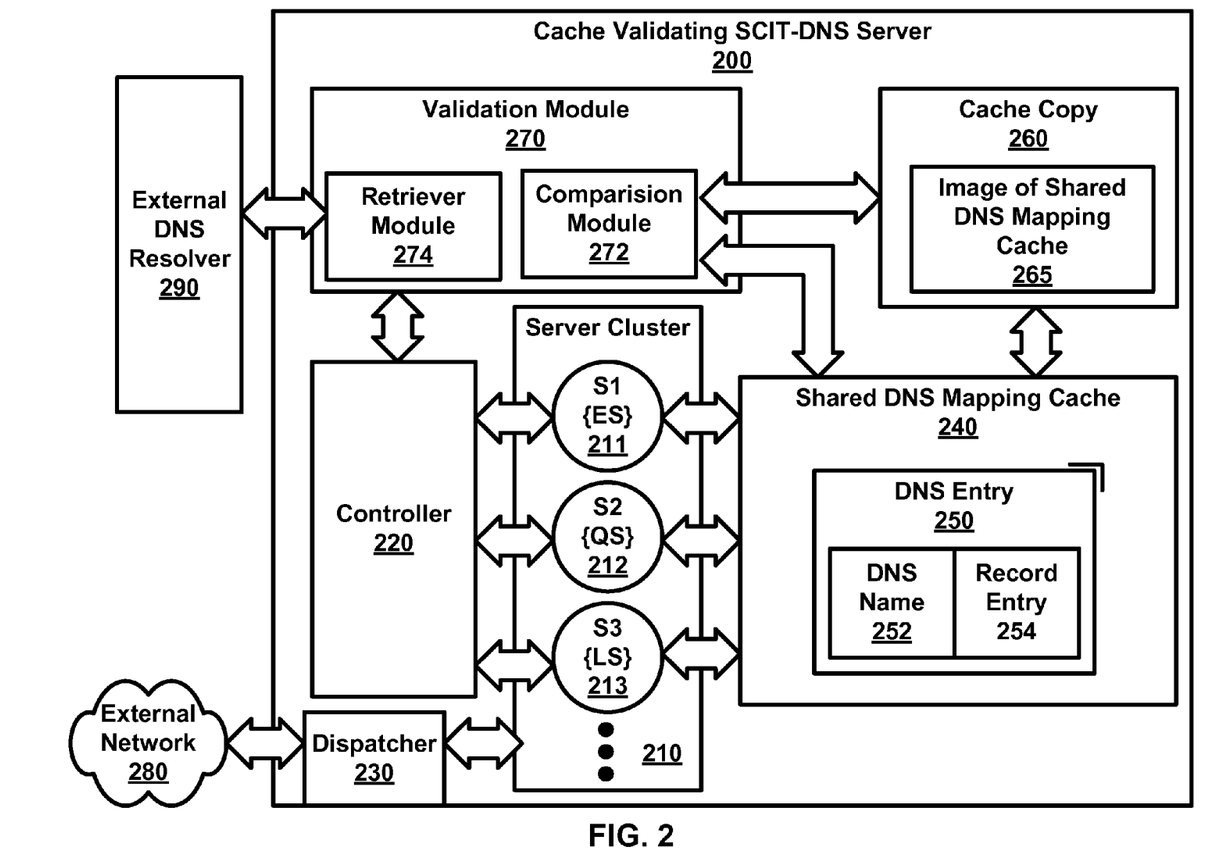
FIG. 2 shows a block diagram of a Cache Validating SCIT DNS Server as per an aspect of an embodiment of the present invention.

FIG. 2 is a block diagram of an embodiment of a cache validating SCIT-DNS Server 200 as per an aspect of an embodiment of the present invention. The cache validating SCIT-DNS Server 200 includes a server cluster 210, a cache copy 260, a controller 220 and a validation module 270.

The server cluster 210 includes at least three servers (211, 212 and 213). Each of the servers (211, 212 and 213) uses a DNS mapping cache 240 configured to maintain at least one DNS entry 250. A DNS entry 250 generally includes a DNS name 252 mapped to a record entry 254. The record entry 254 may be one of many types of records such as an "A" record or an MX record. The sever cluster 210 may also include a dispatcher 230 which transfers data between the external network to a server in an exposed state (eg, ES or QS as necessary).

The cache copy 260 may be configured to maintain an image 265 of the DNS mapping cache. This image could be an image of a server in any state. For example, the cache copy 260 may be configured to maintain an image of the DNS mapping cache 240 of at least one of the servers (211, 212, 213, ...) when they are in an exposed state. Alternatively, the cache copy 260 may be configured to maintain an image of the DNS mapping cache 240 of at least one of the servers (211, 212, 213, ...) when they are in another state such as being in a quiescent state.

Figure 5:
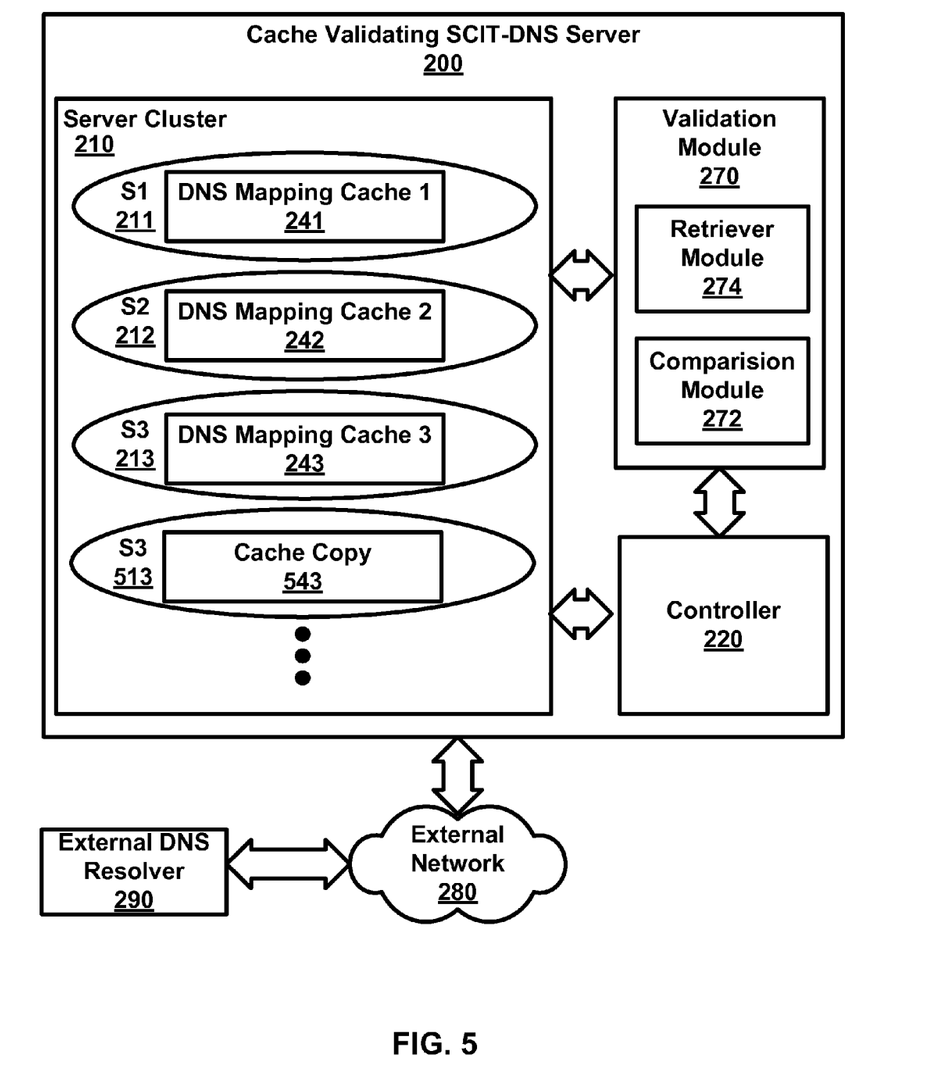
FIG. 5 shows a block diagram of a Cache Validating SCIT DNS Server as per an alternative aspect of an embodiment of the present invention.

The earlier figures have shown the cache copy 260 residing independently of servers (211, 212, 213, ...) in the Cache validating SCIT DNS server 200. However, one skilled in the art will recognize that many other configurations are possible, for example, an alternative arrangement may have the cache copy 260 residing in a server 513 in the server cluster 210 as shown in FIG. 5.

As shown, some of the servers in server cluster 210 may share a DNS mapping cache 240. There are many possible mechanisms for enabling servers to share a DNS mapping cache 240. One such mechanism includes using a shared memory that is hardware accessible within the server cluster 210. Another alternative is to use a data retrieval mechanism of accessing a shared memory over a communications link. That way, the shared DNS mapping cache may be located at a distance from each of the servers (211, 212 & 213) in the server cluster. In the case that this embodiment is created using virtualization mechanisms, the memory may be a addressable on the same physical machine, even though the servers (211, 212 & 213) are virtual.

Figure 3:
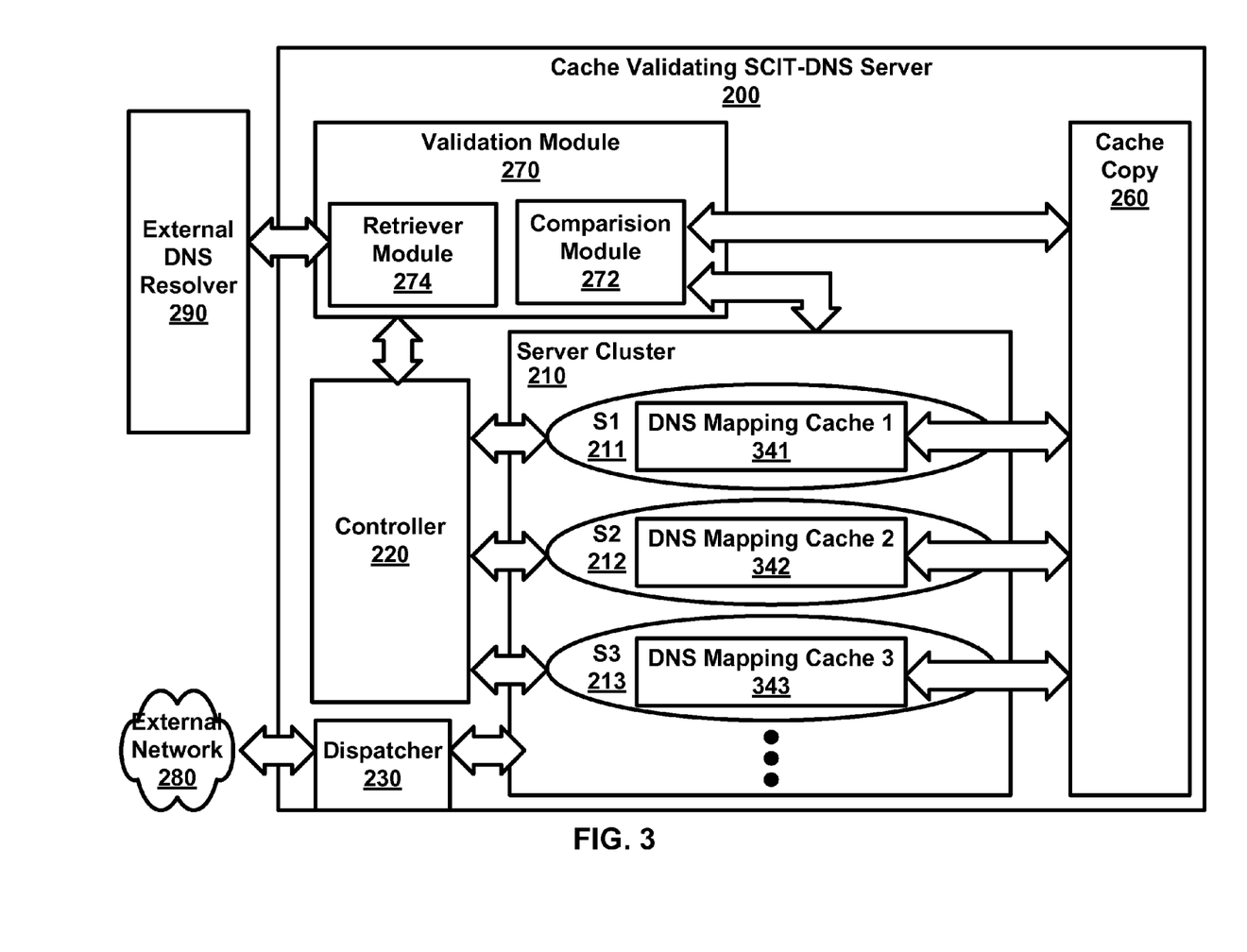
FIG. 3 is a block diagram of an aspect of an alternative embodiment of the present invention.

Other combinations of access to a DNS mapping cache 240 are possible. An example of an alternative configuration is shown in FIG. 3. As shown in FIG. 3, the DNS mapping cache 240 is embodied using individual DNS mapping cache(s) (341, 342 and 343) on three of the servers (211, 212 & 213) in server cluster 210. In a configuration like this, a multicast mechanism may be used to allow the servers to keep their individual DNS mapping cache(s) (341, 341 & 343) synchronized.

Controller 220 is preferably configured to manage the state of servers (211, 212 and 213) in server cluster 210. Specifically, the controller 220 manages the rotation of the servers (211, 212, 213 ...) between a live spare state; an exposed state; a quiescent state; and a self-cleansing state. At least three of the servers (211, 212, 213 ...) are preferably rotated through the following states in the following order: the live spare state; the exposed state; the quiescent state; and the self-cleansing state.

Figure 4:
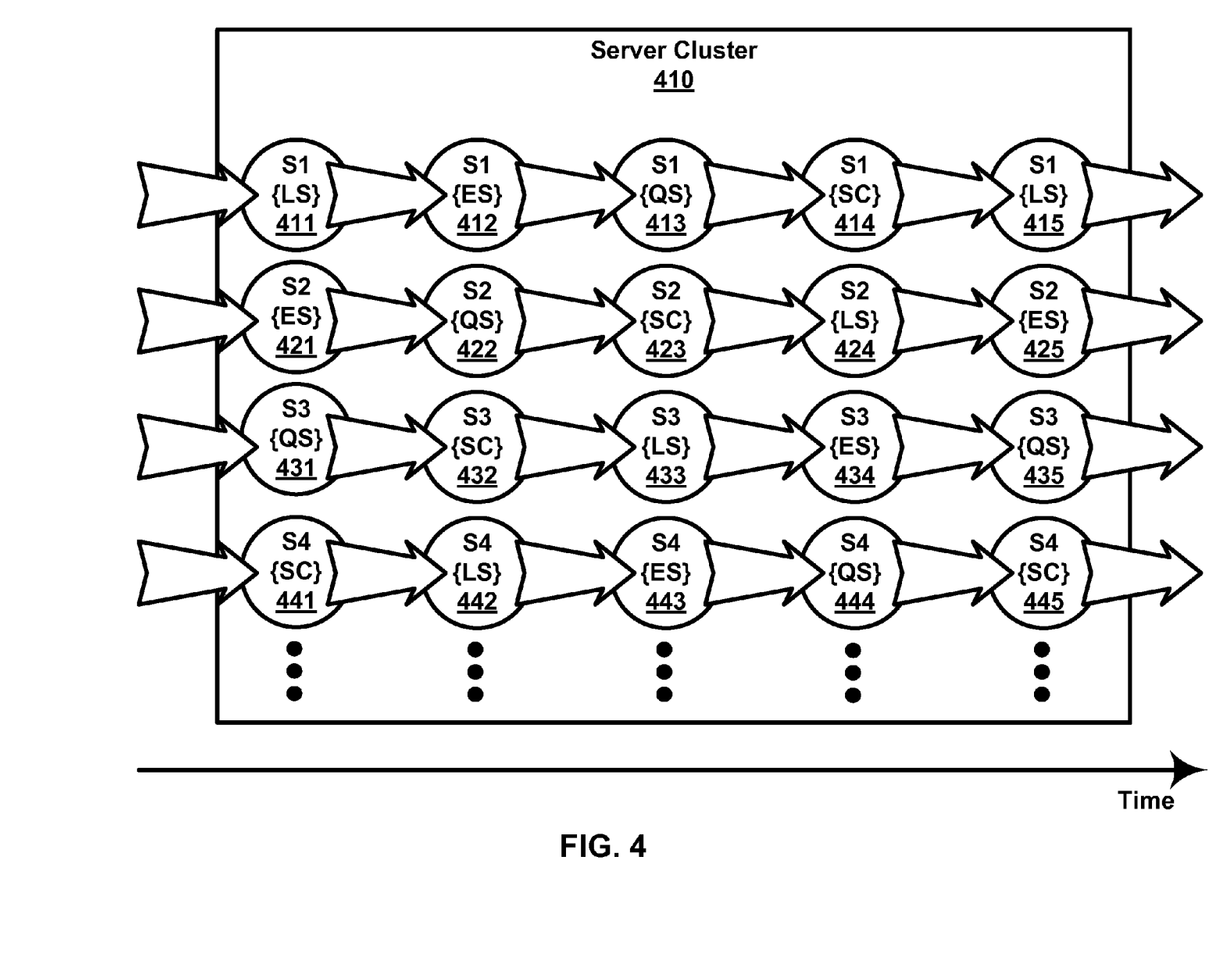
FIG. 4 is a block diagram of a Cache Validating SCIT DNS Server with the cache copy residing in a server as per an aspect of an embodiment of the present invention.

FIG. 4 is an example diagram showing a server cluster 410 with four servers rotating through the following states in the following order: the live spare state (LS); the exposed state (ES); the quiescent state (QS); and the self-cleansing state (CS). As shown server 1 (S1) cycles from an live spare state 411 to an exposed state 412 to a quiescent state 413 to a self-cleansing state 414 and back to a live spare state 415. Server 2 (S2) cycles from an exposed state 421 to a quiescent state 422 to a self-cleansing state 423 to a live spare state 424 and back to an exposed state 425. Server 3 (S3) cycles from a quiescent state 431 to a self-cleansing state 432 to a live spare state 433 to an exposed state 434 to and back to a quiescent state 435. Server 4 (S4) cycles from a self-cleansing state 441 to a live spare state 442 to an exposed state 443 to a quiescent state 444 to and back to a self-cleansing state 445. This diagram is only an example of server rotations. Other combinations and timing are possible. For example, numerous servers in the server cluster 210 could be in the same state. Or, some servers may rotate at different rates. Some servers, such as spare servers, could spend time in a single state without rotating until the rotation becomes necessary or desirable.

A server may be considered to be in an exposed state when that server is allowed to operate with bi-directionally communication over a network. A server may be considered to be in a live spare state when that server is: in a known condition; and is available to connect to a network in an exposed state. A server may be considered to be in a quiescent state when that server is processing DNS queries left unprocessed from when that server was in an exposed state. A server may be considered to be in a self-cleansing state when that server is being terminated and restarted in a known condition.

The validation module 270 is preferably configured to validate at least one DNS entry 250 using retriever module 274 and comparisons module 272. Retriever module 274 should be configured to independently retrieve, from at least one external DNS resolver 290, an independent record entry associated with a selected DNS name 252 from one of the DNS entry(ies) 250. The external DNS resolver 290 may be accessed directly by the cache validating SCIT server 200 or through an external network 280.

The comparison module 272 is preferably configured to compare the "independent record entry" just retrieved by the retriever module 274 with the record entry" associated with the selected DNS name 252 residing in the cache copy 260.

The validation module 270 may use numerous techniques when validating the DNS mapping cache 240. For example, the validation module 270 could validate each DNS entry 250 in a sequential order, in a random order, according to a priority list, by order of modification, by age or the like.

As explained so far, the validation module 270 may cause server(s) into a self-cleansing state whenever a validation error is detected. This process may be initiated directly through the server cluster 210 or through controller 220. Alternatively, the validation module may cause a repair be made to corrupted DNS entry(ies) 250 in response to a detected validation error. A repair may be made by causing the incorrect DNS entry 250 to be overwritten with correct data, or alternatively, causing the DNS entry 250 to be deleted and recreated as a new DNS entry 250 entry.

Yet another technique that may be employed when a validation error is detected is to mark the corrupt DNS entry(ies) 250 as being corrupt and possibly unusable. It may be advantageous for the validation module 270 to cause the cache copy 260 to be updated (either completely or in part) after a validation error is detected.

As an extra layer of safety, the validation module 270 and/or controller 220 may cause at least one of the servers (211, 212, 213, ...) to move into a self-cleansing state periodically independent of detected validation errors. For example, a validation module 270 could signal a controller 220 to expedite the transition a server (211, 212, 213, ...) in an ES state to a QS state. The controller 220 may need to make sure that another server (211, 212, 213, ...) is transitioned in to the ES state during this example. This mechanism may reduce exposure time for entries to become corrupted in the DNS Mapping cache 240. Although it may take some finite amount time to validate the complete DNS cache, especially when it gets large, this may increase the overall security of the cache validating SCIT DNS server 200.

It should be noted that references to "an" embodiment in this disclosure are not necessarily to the same embodiment, and they mean at least one.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

In these embodiments, it is envisioned that embodiments of the Cache Validating SCIT DNS Server 200 will utilize specific server hardware configured to specifically handle DNS server tasks. This may require high speed and high capacity network interface(s) as well as multiple processors. Specific embodiments may need to implement aspects of the embodiment in hardware for speed in combination with software modules. For example, individual servers (211, 212, 213, ...) may be implemented using virtualization technology. However, the collection of servers may in a server cluster 210 may span over several individual processing machines that are necessarily configured to operate in a combined and controlled fashion. In such a configuration, the controller 220 may be performed by an external machine to at least some of the servers. Additionally, the validation module may require special hardware to perform fast comparisons and communication and control functions. The cache copy 260 may utilize a fast copy hardware mechanism to make fast copies of the DNS mapping cache(s). The individual servers (211, 212, 213, ...) may reside in separate hardware servers controlled by external machines such as controller 220 and validation module 270 (which may reside together or separately).

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of DNS servers. However, one skilled in the art will recognize that embodiments of the invention could be used to manage corruption on other types of servers that share corruptible data in their operations such as a server managing communications between embedded control machines in an automated factory.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A cache validating SCIT DNS server comprising:
   a. a cluster of at least three servers, wherein:
      i. each of the at least three servers uses a DNS mapping cache;
      ii. the DNS mapping cache is configured to maintain at least one DNS entry; and
      iii. each of the at least one DNS entry includes a DNS name mapped to a record entry;
   b. a cache copy configured to maintain an image of the DNS mapping cache;
   c. a controller configured to manage a state of each of the at least three servers such that at least three of the at least three servers rotate through:
      i. a live spare state;
      ii. an exposed state;
      iii. a quiescent state; and
      iv. a self-cleansing state; and d. a validation module configured to:
   i. validate at least one DNS entry using:
      a. a retrieving module configured to independently retrieve an independent record entry associated with a selected at least one DNS name in at least one of the at least one DNS entry from at least one external DNS resolver; and
      b. a comparison module configured to compare the independent record entry with the at least one independent record entry associated with the selected at least one DNS name in the cache copy;
   ii. cause at least one of the at least three servers to cycle into the self-cleansing state periodically independent of a detected validation error; and
   iii. selectively validates at least one of the at least one DNS entry.

2. A cache validating SCIT DNS server according to claim 1, wherein the DNS mapping cache includes an individual DNS mapping cache on at least two of said at least three servers.

3. A cache validating SCIT DNS server according to claim 1, wherein at least two of said at least three servers share a DNS mapping cache.

4. A cache validating SCIT DNS server according to claim 1, wherein at least two of said at least three servers share a DNS mapping cache using a multicast mechanism.

5. A cache validating SCIT DNS server according to claim 1, wherein at least two of said at least three servers share a DNS mapping cache using a shared memory.

6. A cache validating SCIT DNS server according to claim 1, wherein the record entry is an A record.

7. A cache validating SCIT DNS server according to claim 1, wherein the record entry is an MX record.

8. A cache validating SCIT DNS server according to claim 1, wherein at least three of the at least three servers rotate states in the following order:
   i. the live spare state;
   ii. the exposed state;
   iii. the quiescent state; and
   iv. the self-cleansing state.

9. A cache validating SCIT DNS server according to claim 1, wherein the validation module causes at least one of the at least three servers to cycle into the self-cleansing state when a validation error is detected.

10. A cache validating SCIT DNS server according to claim 1, wherein the validation module causes at least one of the at least one DNS entry to be repaired when a validation error is detected.

11. A cache validating SCIT DNS server according to claim 1, wherein the validation module causes at least one of the at least one DNS entry to be marked when a validation error is detected.

12. A cache validating SCIT DNS server according to claim 1, wherein the validation module updates the cache copy when a validation error is detected.

13. A cache validating SCIT DNS server according to claim 1, wherein the validation module randomly validates at least two of the at least one DNS entry.

14. A cache validating SCIT DNS server according to claim 1, wherein the exposed state allows bi-directionally communication over a network.

15. A cache validating SCIT DNS server according to claim 1, wherein at least one of the at least three servers is in a live spare state when the at least one of the at least three servers is:
   a. in a known condition; and
   b. is available to connect to a network in an exposed state.

16. A cache validating SCIT DNS server according to claim 1, wherein at least one of the at least three servers is in a quiescent state when the at least one of the at least three servers is processing DNS queries left unprocessed when the at least one of the at least three servers was in an exposed state.

17. A cache validating SCIT DNS server according to claim 1, wherein at least one of the at least three servers is in a self-cleansing state when the at least one of the at least three servers is being terminated and restarted in a known condition.

18. A cache validating SCIT DNS server according to claim 1, wherein the cache copy is configured to maintain an image of the DNS mapping cache of at least one of the at least three servers in an exposed state.

19. A cache validating SCIT DNS server according to claim 1, wherein the cache copy is configured to maintain an image of the DNS mapping cache of at least one of the at least three servers in a quiescent state.

* * * * *